(12) United States Patent
Liu et al.

(10) Patent No.: US 11,469,989 B2
(45) Date of Patent: Oct. 11, 2022

(54) PACKET SENDING METHOD AND DEVICE (71) Applicant: HUAWEI TECHNOLOGIES CO., LTD., Shenzhen (CN)

(72) Inventors: Guoquan Liu, Beijing (CN); Ruqin Lan, Beijing (CN); Zuliang Wang, Beijing (CN); Zhibo Hu, Beijing (CN); Chenxi Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/343,968

(22) Filed: Jun. 10, 2021

(65) Prior Publication Data
US 2021/0399977 A1 Dec. 23, 2021

(30) Foreign Application Priority Data

Jun. 17, 2020 (CN) .......................... 202010553730.X (51) Int. Cl.
*H04L 45/00* (2022.01)
*H04L 45/02* (2022.01)
(Continued)

(52) U.S. Cl.
CPC .............. *H04L 45/20* (2013.01); *H04L 45/02* (2013.01); *H04L 45/22* (2013.01); *H04L 45/24* (2013.01); *H04L 45/748* (2013.01)

(58) Field of Classification Search
CPC ......... H04L 45/20; H04L 45/02; H04L 45/22; H04L 45/24; H04L 45/748
See application file for complete search history.

(56) References Cited

U.S. PATENT DOCUMENTS 6,954,437 B1 * 10/2005 Sylvest ................. H04L 45/583
370/256
9,100,328 B1 * 8/2015 Atlas ....................... H04L 45/28
(Continued)

FOREIGN PATENT DOCUMENTS

CN 105282028 A 1/2016
WO 2013/091523 A1 6/2013

OTHER PUBLICATIONS

Atlas et al., "An Architecture for IP/LDP Fast-Reroute Using Maximally Redundant Trees, draft-ietf-rtgwg-mrt-frr-architecture-09", Routing Area Working Group, Jan. 10, 2016; 48 pages.
(Continued)

*Primary Examiner* — Jimmy H Tran
(74) *Attorney, Agent, or Firm* — Maier & Maier, PLLC (57) ABSTRACT

A packet sending method and device. The first node sets a next-hop of the routing information to a next-hop through which the first node reaches the first route source. The destination address of the routing information is the address prefix. When the second route source is superior to the first route source, the first node switches the next-hop of the routing information to a next-hop through which the first node reaches the second route source. Then, the first node adds, to a target packet, path information of a forwarding path from the first node to the second route source according to the switching operation, where a destination address of the target packet matches the address prefix. Finally, the first node forwards the target packet to the second route source through the forwarding path.

12 Claims, 6 Drawing Sheets

(51) Int. Cl.
*H04L 45/24* (2022.01)
*H04L 45/748* (2022.01)

(56) References Cited

U.S. PATENT DOCUMENTS

| | | | | |
|---|---|---|---|---|
| 9,350,654 | B1* | 5/2016 | Gredler | H04L 45/507 |
| 9,838,246 | B1* | 12/2017 | Hegde | H04L 45/22 |
| 2005/0276216 | A1* | 12/2005 | Vasseur | H04L 45/18 |
| | | | | 370/222 |
| 2007/0091796 | A1* | 4/2007 | Filsfils | H04L 45/28 |
| | | | | 370/228 |
| 2007/0127395 | A1* | 6/2007 | Jain | H04L 45/60 |
| | | | | 370/254 |
| 2007/0253416 | A1* | 11/2007 | Raj | H04L 45/02 |
| | | | | 370/395.5 |
| 2013/0051217 | A1* | 2/2013 | So | H04L 45/22 |
| | | | | 370/217 |
| 2014/0211639 | A1 | 7/2014 | Matthews et al. | |
| 2015/0288536 | A1* | 10/2015 | Bryant | H04L 43/0811 |
| | | | | 370/254 |
| 2018/0359175 | A1* | 12/2018 | Decraene | H04L 45/22 |
| 2019/0363975 | A1* | 11/2019 | Djernaes | H04L 49/1515 |
| 2021/0399974 | A1* | 12/2021 | Sikhivahan | H04L 45/122 |

OTHER PUBLICATIONS

Atlas et al., "Basic Specification for IP Fast-Reroute: Loop-free Alternates, draft-ietf-rtgwg-ipfrr-spec-base-05", Network Working Group, Feb. 2006; 26 pages.

* cited by examiner

PACKET SENDING METHOD AND DEVICE

CROSS-REFERENCE TO RELATED APPLICATIONS

This application claims priority to Chinese Patent Application No. 202010553730.X, filed on Jun. 17, 2020, which is hereby incorporated by reference in its entirety.

TECHNICAL FIELD

The embodiments relate to the field of communication technologies, and in particular, to a packet sending method and device.

BACKGROUND

Loops are generated due to distributed out-of-order convergence in Internet protocol (IP) networks. An intermediate system to intermediate system (IS-IS) link state or an open shortest path first (OSPF) link state are used as an example. Each time a network topology changes, some routers are required to update forward information bases (FIB) of the routers based on a new topology. Different routers may have transient inconsistency due to different convergence sequences. Duration of the inconsistency may range from milliseconds to seconds depending on device capabilities, configuration parameters, service volumes, and the like. In this duration, the routers along a path that forward a packet may be in a pre-convergence state or in a post-convergence state. This may cause a forwarding loop. The loop does not disappear until all devices along the path complete convergence. The transient loop is referred to as a microloop. The microloop may lead to problems such as network packet loss, delay variation, and packet disorder.

There is a multi-source route switching scenario in an interior gateway protocol (IGP) network. For example, an IGP domain includes a plurality of nodes (the node may be referred to as a route source, and the node may be a router, a switch, or the like) for advertising routes of another IGP domain. When a packet needs to be forwarded to the another IGP domain, a route source (the source may be referred to as an optimal route source) with a minimum path cost is usually selected as a transit node for packet forwarding. However, when the optimal route source is unreachable, a new route source is reselected as an optimal route source. This process is referred to as multi-source route switching.

The microloop commonly exists in the IP network, and exists in the foregoing multi-source route switching scenario. How to avoid the microloop in the multi-source route switching scenario is a technical problem that is urgently to be resolved by persons skilled in the art.

SUMMARY

The embodiments provide a packet sending method and device to avoid a microloop in a multi-source route switching scenario.

According to a first aspect, the embodiments provide a packet sending method. The method is applied to a communication network. The method is applied to a communication network. The communication network includes a first node, a first route source, and a second route source. Both the first route source and the second route source are nodes for advertising an address prefix. The first node includes first routing information. The method includes the following.

The first node sets a next-hop node of the first routing information to a next-hop node through which the first node reaches the first route source. A destination address of the first routing information is the address prefix.

When the second route source is superior to the first route source, the first node switches the next-hop node of the first routing information to a next-hop node through which the first node reaches the second route source. The first node adds first explicit path information to a target packet according to the switching operation. A destination address of the target packet matches the address prefix. The first explicit path information is used to indicate a forwarding path from the first node to the second route source. The first node forwards the target packet to the second route source through the forwarding path.

In the embodiments, route source switching triggers an anti-microloop mechanism (adding explicit path information to a packet), thereby implementing an anti-microloop function in a multi-source switching scenario.

In a possible implementation, that the first node adds the first explicit path information to the target packet according to the switching operation includes:

within fixed duration after the switching operation, the first node adds the first explicit path information to the target packet according to the switching operation.

A microloop is formed due to transient inconsistency between different nodes because of different convergence sequences of nodes in a network. Therefore, a state of the microloop is only temporary. No microloop occurs after all the nodes in the network complete convergence. Therefore, in the embodiments, it is restricted that the explicit path information is added to the target packet only within the fixed duration after the route source switching operation. If the duration expires, the explicit path information does not need to be added, thereby saving computing resources of the first node.

In a possible implementation, that the second route source is superior to the first route source includes:

a second minimum path cost from the first node to the second route source is less than a first minimum path cost from the first node to the first route source; or the first route source is unreachable for the first node.

In a possible implementation, that the first route source is unreachable for the first node includes:

all paths from the first node to the first route source fail; the first route source fails; or
the first route source no longer advertises the address prefix.

In the embodiments, regardless of whether the route source switching is caused because a first routing process fails (for example, all the paths from the first node to the first route source fail, or the first route source fails) or a second routing process fails (for example, the first route source no longer advertises the first routing information), the routing microloop problem can be resolved by using the foregoing method provided in this embodiment.

In a possible implementation, that the first route source no longer advertises the address prefix includes:

all forwarding paths from the first route source to a second node fail, where an address of the second node matches the address prefix.

In a possible implementation, the second minimum path cost from the first node to the second route source is less than the first minimum path cost from the first node to the first route source. The first minimum path cost includes a sum of a link cost from the first node to the first route source and a first cost of the address prefix. The first cost includes a link cost from the first route source to a node indicated by the address prefix. The second minimum path cost includes a sum of a link cost from the first node to the second route source and a second cost of the address prefix. The second cost includes a link cost from the second route source to the node indicated by the address prefix.

In the embodiments, the cost of the address prefix is included in the path cost, to more accurately find a path with a minimum cost, thereby saving resources.

In a possible implementation, the first explicit path information includes one or more of the following: a prefix label or a node label of the second route source, a node label or a prefix label of a node on a first forwarding path, and a link label of a link on the first forwarding path. The first forwarding path is a forwarding path from the first node to the second route source.

In the embodiments, the explicit path information added to the target packet may be loose path information, or may be strict path information. The explicit path information may include a node label or a prefix label of a node or may include a link label of a link. This is determined as required in an actual case, provided that a forwarding path indicated by the added explicit path information is a loop-free path.

According to a second aspect, the embodiments provide a packet sending device. The device is used in a communication network. The communication network includes the device, a first route source, and a second route source. Both the first route source and the second route source are nodes for advertising an address prefix. The device includes first routing information. The device includes a setting unit, a switching unit, an adding unit, and a forwarding unit.

The setting unit is configured to set a next-hop node of the first routing information to a next-hop node through which the device reaches the first route source. A destination address of the first routing information is the address prefix.

The switching unit is configured to: when the second route source is superior to the first route source, switch the next-hop node of the first routing information to a next-hop node through which the device reaches the second route source.

The adding unit is configured to add first explicit path information to a target packet according to the switching operation. A destination address of the target packet matches the address prefix. The first explicit path information is used to indicate a forwarding path from the device to the second route source.

The forwarding unit is configured to forward the target packet to the second route source through the forwarding path.

In a possible implementation, the adding unit is configured to:
  within fixed duration after the switching operation, add the first explicit path information to the target packet according to the switching operation.

In a possible implementation, that the second route source is superior to the first route source includes:
  a second minimum path cost from the first node to the second route source is less than a first minimum path cost from the first node to the first route source; or the first route source is unreachable for the first node.

In a possible implementation, that the first route source is unreachable for the first node includes:
  all paths from the device to the first route source fail;
  the first route source fails; or
  the first route source no longer advertises the address prefix.

In a possible implementation, that the first route source no longer advertises the address prefix includes:
  all forwarding paths from the first route source to a second node fail, where an address of the second node matches the address prefix.

In a possible implementation, the second minimum path cost from the first node to the second route source is less than the first minimum path cost from the first node to the first route source. The first minimum path cost includes a sum of a link cost from the first node to the first route source and a first cost of the address prefix. The first cost includes a link cost from the first route source to a node indicated by the address prefix. The second minimum path cost includes a sum of a link cost from the first node to the second route source and a second cost of the address prefix. The second cost includes a link cost from the second route source to the node indicated by the address prefix.

In a possible implementation, the first explicit path information includes one or more of the following: a prefix label or a node label of the second route source, a node label or a prefix label of a node on a first forwarding path, and a link label of a link on the first forwarding path. The first forwarding path is a forwarding path from the device to the second route source.

According to a third aspect, the embodiments provide a packet sending device. The device is used in a communication network. The communication network includes the device, a first route source, and a second route source. Both the first route source and the second route source are nodes for advertising an address prefix. The device includes first routing information. The device includes a processor, a communication interface, and a memory. The memory is configured to store a computer program and/or data. The processor is configured to execute the computer program stored in the memory to implement the following operations.

A next-hop node of the first routing information is set to a next-hop node through which the device reaches the first route source. A destination address of the first routing information is the address prefix. When the second route source is superior to the first route source, the next-hop node of the first routing information is switched to a next-hop node through which the device reaches the second route source. First explicit path information is added to a target packet according to the switching operation. A destination address of the target packet matches the address prefix. The first explicit path information is used to indicate a forwarding path from the device to the second route source. The target packet is forwarded to the second route source through the forwarding path.

In a possible implementation, adding the first explicit path information to the target packet according to the switching operation is:
  within fixed duration after the switching operation, adding the first explicit path information to the target packet according to the switching operation.

In a possible implementation, that the second route source is superior to the first route source includes:
  a second minimum path cost from the device to the second route source is less than a first minimum path cost from the device to the first route source; or the first route source is unreachable for the device.

In a possible implementation, that the first route source is unreachable includes:
  all paths from the device to the first route source fail;
  the first route source fails; or
  the first route source no longer advertises the address prefix.

In a possible implementation, that the first route source no longer advertises the address prefix includes:

all forwarding paths from the first route source to a second node fail, where an address of the second node matches the address prefix.

In a possible implementation, the second minimum path cost from the device to the second route source is less than the first minimum path cost from the device to the first route source. The first minimum path cost includes a sum of a link cost from the device to the first route source and a first cost of the address prefix. The first cost includes a link cost from the first route source to a node indicated by the address prefix. The second minimum path cost includes a sum of a link cost from the device to the second route source and a second cost of the address prefix. The second cost includes a link cost from the second route source to the node indicated by the address prefix.

In a possible implementation, the first explicit path information includes one or more of the following: a prefix label or a node label of the second route source, a node label or a prefix label of a node on a first forwarding path, and a link label of a link on the first forwarding path. The first forwarding path is a forwarding path from the device to the second route source.

According to a fourth aspect, the embodiments provide a computer readable storage medium. The computer readable storage medium stores a computer program. The computer program is executed by a processor to implement the method according to any implementation of the first aspect.

According to a fifth aspect, the embodiments provide a computer program product. When the computer program product is read and executed by a computer, the method according to any implementation of the first aspect is performed.

According to a sixth aspect, the embodiments provide a computer program. When the computer program is executed by a computer, the computer is enabled to implement the method according to any implementation of the first aspect.

Thus, in the embodiments, route source switching triggers an anti-microloop mechanism (adding explicit path information to a packet), thereby implementing an anti-microloop function in a multi-source switching scenario. In this way, problems such as network packet loss, delay variation, and packet disorder are avoided.

BRIEF DESCRIPTION OF THE DRAWINGS

The following briefly describes the accompanying drawings for the embodiments.

DETAILED DESCRIPTION OF THE EMBODIMENTS

The following describes the embodiments with reference to the accompanying drawings.

Figure 1:
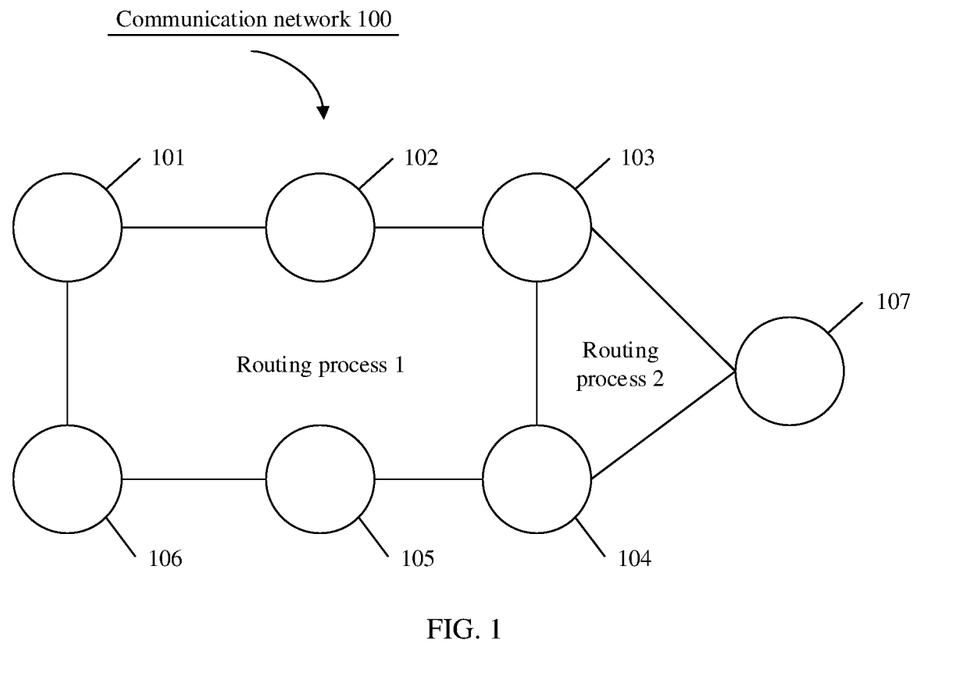
FIG. 1 is a schematic structural diagram of a communication network according to an embodiment.

FIG. 1 shows a possible application scenario of a packet sending method according to an embodiment. The scenario is a schematic diagram of a network structure of a communication network 100. A plurality of routing processes may be simultaneously run in the communication network 100. Two routing processes are drawn in an example in FIG. 1. The two routing processes are a routing process 1 and a routing process 2.

The routing process is a process running in a routing domain. The routing domain may also be referred to as an autonomous system (AS). For example, the routing process 1 is run within a routing domain including a node 101, a node 102, a node 103, a node 104, a node 105, and a node 106; and the routing process 2 is run within a routing domain including the node 103, the node 104, and a node 107. It should be noted that the nodes included in the routing process 1 and the routing process 2 are not limited to the nodes shown in FIG. 1 and may further include more nodes (not shown in FIG. 1).

Boarder routing nodes between the two routing domains may introduce address prefixes of the nodes in the two routing domains. For example, two border routing nodes: the node 103 and the node 104 may introduce routes in the routing process 2 into the routing process 1. Therefore, address prefixes of these introduced routes may be advertised in the routing process 1. For example, the node 103 and the node 104 introduce a route to the node 107 into the routing process 1, and then advertise an address prefix of the introduced route in the routing process 1, that is, an address prefix of the node 107. Similarly, routes in the routing process 1 may be introduced into the routing process 2, so that address prefixes of these introduced routes may be advertised in the routing process 2. In this way, communication between the nodes in the two routing processes can be implemented. The address prefix of the node may be used to identify the node in the routing domain.

It should be noted that although the node 103 and the node 104 advertise, in the routing process 1, the address prefixes of the nodes in the routing process 2, the nodes in the routing process 1 do not sense the nodes in the routing process 2. Instead, the address prefixes advertised by the node 103 and the node 104 are considered as address prefixes of the node 103 and the node 104. When a node in the routing process 1 needs to send a packet to another node in the routing process 2, the node first sends the packet to a node that is in the routing process 1 and that advertises an address prefix of the another node. Then, the node that advertises the address prefix forwards the packet to the another node. Similarly, the nodes in the routing process 2 also do not sense the nodes in the routing process 1. For details, refer to the foregoing description. Details are not described herein again.

Optionally, the node in the communication network 100 may be a router, or may be a switch, or the like.

An application scenario of the packet sending method provided in this embodiment is not limited to the cross-process multi-source routing scenario shown in FIG. 1. The scenario shown in FIG. 1 is merely an example. A scenario in which the packet sending method provided in this embodiment may be applied, for example, any multi-source routing scenario falls within the scope of the embodiments.

The following describes some concepts related to the embodiments.

1. A route source indicates a node that advertises an address prefix in a communication network, for example, the node 103 and the node 104 in the scenario shown in FIG. 1.

2. Multi-source routing indicates that a routing domain includes a plurality of nodes that can advertise a same address prefix. For example, in the scenario shown in FIG. 1, both the node 103 and the node 104 in a same routing domain can advertise a same address prefix.

3. An optimal route source indicates that in a routing domain, if a minimum path cost from a node to a route source is less than a minimum path cost from the node to another route source, the route source is an optimal route source for the node. The path cost is used to measure a cost for reaching a target node. A value of the path cost is a sum of all link costs on a path between two nodes and a cost of an address prefix. A path with a minimum path cost is an optimal path for reaching the target node. For example, in the scenario shown in FIG. 1, in a same routing domain, it is assumed that a node can communicate with a node in another routing domain only by using a route source (the node 103 or the node 104). In this case, if a minimum path cost for reaching the node 103 by the node is less than a minimum path cost for reaching the node 104 by the node, the node 103 is an optimal route source for the node.

It should be noted that, in a process of communication between nodes in two routing domains, a start node in a first routing domain does not sense a destination node in another routing domain, but considers an optimal transit route source as the destination node; and therefore, for the start node, a next hop from the start node to the destination node is a next hop of routing information from the start node to the optimal route source.

In another possible implementation, the optimal route source may not be defined based on the path cost, but may be obtained in another manner, for example, through pre-configuration or through calculation based on a specific algorithm. A specific manner of defining the optimal route source may be determined based on an actual case. This is not limited in the embodiments.

4. Multi-source route switching indicate that, in a routing domain, when a determined optimal route source is unreachable, a new route source is reselected as an optimal route source. This process is referred to as multi-source route switching. The multi-routing-source switching is switching a next hop from a node to a route source to a next hop from the node to another route source. For example, in the scenario shown in FIG. 1, it is assumed that the node 103 is an optimal route source for a node. However, in this case, when the node 103 is unreachable, the node communicates with a node in another routing domain (for example, the node 107) by using the node 104, that is, the optimal route source is switched to the node 104. In an implementation, it is assumed that the node 102 is a next hop from the node 101 to the node 103, and the node 106 is a next hop from the node 101 to the node 104. In this case, switching the optimal route source to the node 104 is switching the next hop from the node 102 to the node 106 in routing information that is included in the node 101 and in which a destination node is 107.

In a possible implementation, in the node 101, the next hop of the routing information from the node 101 to the node 104 does not change and is the node 106. Herein, the next hop from the node 101 to the node 107 changes due to route source switching.

In another possible implementation, when a determined optimal route source of a node is unreachable, it may cause a change of a next hop of the optimal route source after switching of the node. A changed next hop may be a next hop for reaching an updated optimal route source that is obtained through recalculation based on a topology updated after the optimal route source is unreachable. For example, in FIG. 1, if a network topology changes after the optimal route source node 103 is unreachable, a route from the node 101 to the optimal route source node 104 after the switching is recalculated. A next hop from the node 101 to the node 104 in the route obtained after the recalculation may be another node (not shown in FIG. 1) instead of the node 106.

In an embodiment, the network topology of the communication network changes because the optimal route source is unreachable and sensing the change of the network topology by the nodes in the communication network is different in terms of time due to different performance, parameter configuration, and service volumes of the nodes in the communication network. In other words, a routing microloop is generated due to different convergence sequences of the nodes.

For ease of understanding, FIG. 1 is used as an example for description. In FIG. 1, it is assumed that the node 101 is a start node of communication, the node 107 is a destination node, the node 103 and the node 104 are route sources that advertise the address prefix of the node 107 in the routing process 1, and the node 103 is the optimal route source. In this case, when the network operates normally, the packet sent from the node 101 to the node 107 is transferred by using the optimal route source 103, that is, the packet forwarding path is the node 101—the node 102—the node 103—he node 107. However, when the optimal route source 103 is unreachable, for example, when a link from the node 102 to the node 103 fails, the node 101 first senses the failure and converges; and therefore switches the optimal route source to 104, that is, switches a next hop of the packet forwarding path to the node 106, to forward the packet to the node 106. However, due to reasons such as node performance, parameter configuration, and a service volume, convergence of the node 106 is slower than that of the node 101. For example, the node 106 does not sense the failure and still considers the node 103 as the optimal route source. Therefore, the node 106 still forwards the packet to the node 101, thereby forming a microloop.

Figure 2:
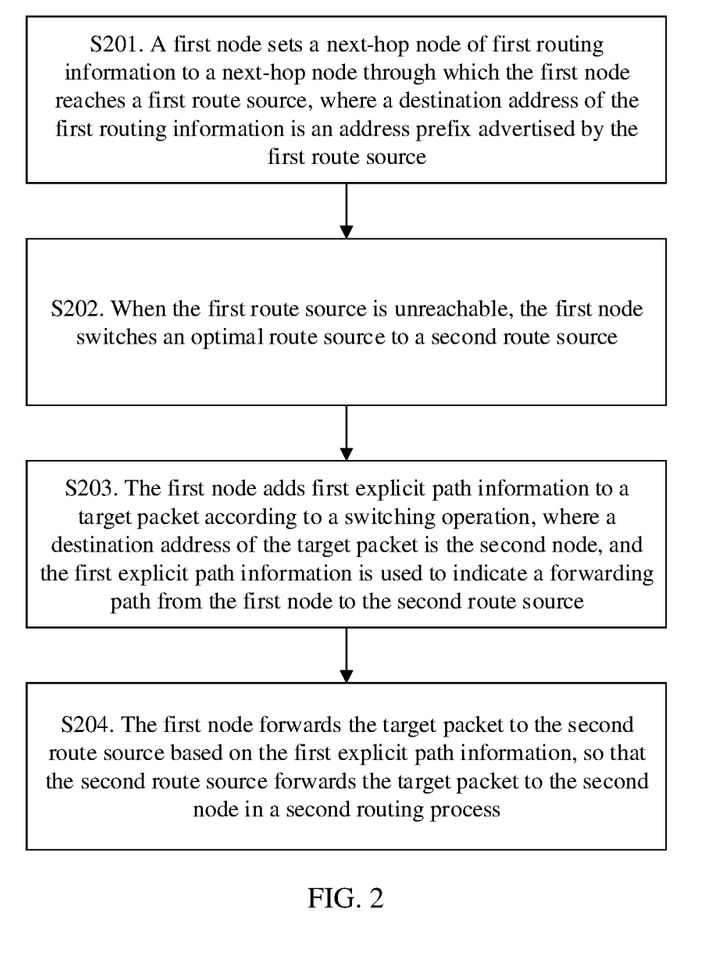
FIG. 2 is a schematic flowchart of a packet sending method according to an embodiment.

To resolve this problem, in the embodiments, the switching operation of the optimal route sources may trigger an anti-microloop mechanism. In other words, explicit path information is added to a target packet to indicate a forwarding path of the packet, to avoid a microloop. On this basis, the following describes a packet sending method provided in an embodiment. The method may be applied to, but is not limited to, the scenario shown in FIG. 1. With reference to FIG. 2, the method may include, but is not limited to, the following steps.

S201. A first node sets a next-hop node of first routing information to a next-hop node through which the first node reaches a first route source. A destination address of the first routing information is an address prefix advertised by the first route source.

In a communication network, the first route source is a node for advertising the address prefix, the first node includes the first routing information, the destination address of the first routing information is the address prefix, and the address prefix is an address prefix of a destination node of the first routing information. The address prefix is referred to as a destination address prefix below.

In an embodiment, to implement communication between nodes in two routing processes, a route source of the two routing processes needs to be used as a transit node. The two routing processes may be referred to as a first routing process and a second routing process. For example, the first routing process may be the routing process 1 shown in FIG. 1, and the second routing process may be the routing process 2 shown in FIG. 1.

It may be understood from the foregoing description that communication between the nodes in the first routing process and the second routing process may also be referred to as communication between nodes in two routing domains corresponding to the two routing processes.

The first routing process and the second routing process may be two adjacent routing processes in the communication network. A plurality of boundary routing nodes are included between the two routing processes. These boundary routing nodes may advertise, in the first routing process, an address prefix of a node in the second routing process. Further, these boundary routing nodes may also advertise, in the second routing process, an address prefix of a node in the first routing process. It may be understood based on the foregoing description that the plurality of boundary routing nodes may be referred to as route sources.

The address prefix advertised by the route source may be indicated to another node in a routing domain in a flooding manner. For example, in an interior gateway protocol (IGP) network, the address prefix may be flooded according to the IGP protocol. Alternatively, in a network running another protocol, the address prefix may be advertised according to regulations of the another protocol. This is not limited in this embodiment.

The first node may be a node in the first routing process. The first node needs to communicate with a second node in the second routing process. The first node may obtain an address prefix of the second node based on the address prefix flooded by the plurality of route sources. The address prefix of the second node is the destination address prefix. It may be understood from the foregoing description that the first node does not sense the second node. Because the address prefix of the second node is flooded to the first node by using the route source, the first node considers the address prefix of the second node as the address prefix of the route source. For ease of understanding, for example, it is assumed that a network address of the second node is 1.1.1.1/32. In this case, the address prefix that is of the second node and that is flooded by the route source may be 1.1.1.1.

After the first node receives the destination address prefix that is advertised by the plurality of route sources in a flooding manner, the first node may calculate forwarding paths from the first node to the destination address prefix, that is, forwarding paths from the first node to the plurality of route sources based on an algorithm such as an open shortest path first algorithm. Because the first node considers the address prefix of the second node as an address prefix of the plurality of route sources. Herein, the forwarding paths obtained through calculation are actually the forwarding paths from the first node to the plurality of route sources. The first node may store the forwarding paths obtained through calculation for subsequent use.

It should be noted that a forwarding path from a node to another node in this embodiment may be an optimal forwarding path in feasible forwarding paths obtained through calculation according to a protocol running in the communication network, for example, a forwarding path with a minimum path cost.

Then, the first node determines the optimal route source based on the plurality of forwarding paths, that is, determines the first route source. Communication between the first node and the second node is implemented through transferring performed by the first route source. In addition, routing information, that is, the first routing information is generated based on a forwarding path corresponding to the first route source. Destination address information included in the first routing information is the address prefix of the second node. The next-hop node of the first routing information is a next-hop node through which the first node reaches the first route source.

For ease of understanding, for example, in the scenario shown in FIG. 1, the first node may be the node 101, the second node may be the node 107, and the first route source may be the node 103 or the node 104. Whether the first route source is the node 103 or the node 104 depends on a path cost from the first node to the node 103 and that from the first node to the node 104. A node with a minimum path cost is the optimal route source, that is, the first route source.

Figure 3:
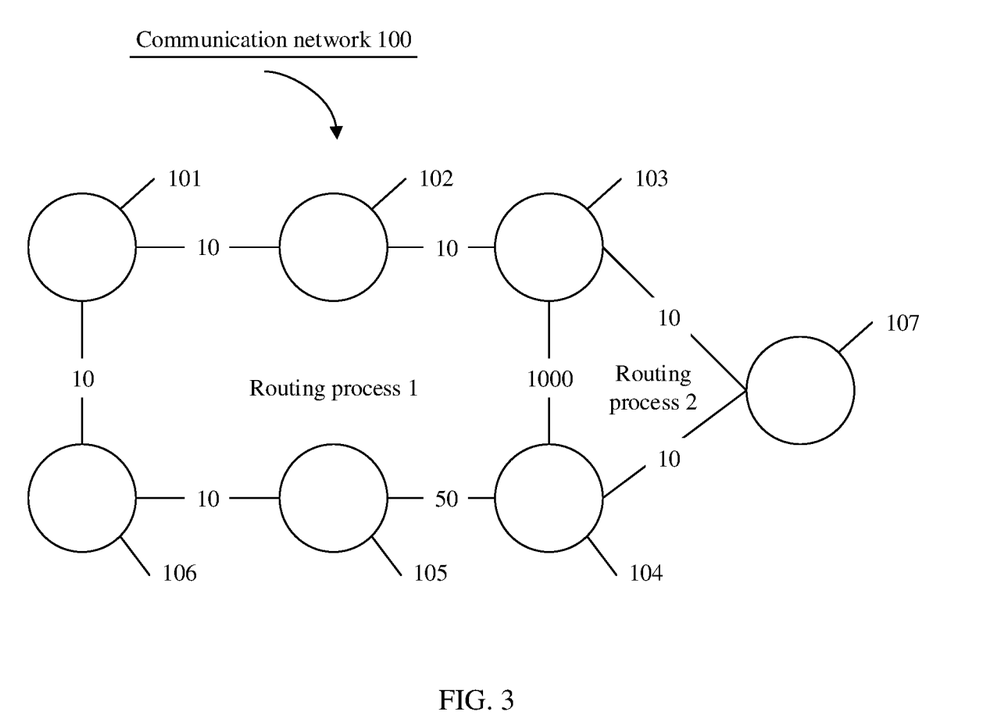
FIG. 3 is a schematic diagram of a link cost in a communication network according to an embodiment.

For example, with reference to FIG. 3, FIG. 3 shows a network the same as the network shown in FIG. 1. The description of FIG. 1 is applicable to FIG. 3. FIG. 3 shows a link cost of each link. The link cost indicates a cost of a link between two adjacent nodes. It may be understood based on the link costs shown in FIG. 3 that a minimum path cost from the node 101 to the node 103 is 20, and a minimum path cost from the node 101 to the node 104 is 70. It may be understood through comparison that the node 103 is the first node, that is, the optimal route source for the node 101. The next-hop node of the first routing information is the next-hop node from the node 101 to the node 103, that is, the node 102.

Determining the optimal route source based on the path cost is merely an example. The optimal route source may be alternatively determined in another manner. This is not limited in this embodiment.

In another possible implementation, that the first node calculates the forwarding paths from the first node to the plurality of route sources, determines the optimal route source, and generates the routing information may be all completed by a controller. Then, the controller sends, to the first node, information about the forwarding paths obtained through calculation, and the generated routing information.

S202. When a second route source is superior to the first route source, the first node switches the next-hop node of the first routing information to a next-hop node through which the first node reaches the second route source.

The second route source is the same as the first route source. The two route sources are both nodes for advertising the destination address prefix. Based on the foregoing description, when the second route source is superior to the first route source, the first node may switch the optimal route source to the second route source. For example, the first node may switch the next-hop node of the first routing information to the next-hop node through which the first node reaches the second route source. After the switching of the optimal route source, communication between the first node and the second node is implemented through transferring performed by the second route source. The second route source may be a route source, other than the first route source in the plurality of route sources, with a minimum forwarding path cost to the first node.

For example, in the scenario shown in FIG. 3, the first route source is the node 103, and the second route source is the node 104. When the node 104 is superior to the node 103, the node 101 switches the optimal route source to the node 104, that is, the node 104 is the second route source. The switching of the optimal route source for the node 101 is switching the original next-hop node 102 of the first routing information to the next-hop node 106 from the node 101 to the route source node 104.

That the second route source is superior to the first route source may include a case in which a second minimum path cost from the first node to the second route source is less than a first minimum path cost from the first node to the first route source, and a case in which the first route source is unreachable for the first node.

The case in which the second minimum path cost from the first node to the second route source is less than the first minimum path cost from the first node to the first route source may further include the following two subcases.

In a first subcase, the minimum path cost includes a sum of a link cost and a cost of the foregoing destination address prefix. The cost of the destination address prefix indicates a link cost from the route source to the node indicated by the destination address prefix.

For example, the first minimum path cost includes all link costs on the forwarding path from the first node to the first route source and all link costs on the forwarding path from the first route source to the node indicated by the destination address prefix. For example, the second minimum path cost includes all link costs on the forwarding path from the first node to the second route source and all link costs on the forwarding path from the second route source to the node indicated by the destination address prefix. For ease of understanding, FIG. 3 is used as an example for description.

In FIG. 3, when the network is normal and does not fail, a path with a minimum cost from the first node 101 to the first route source node 103 is the node 101—the node 102—the node 103. The link cost of the path is 20. A path with a minimum cost from the node 101 to the second route source 104 is the node 101—the node 106—the node 105—the node 104. The link cost of the path is 70. The link cost from the first route source node 103 to the node 107 indicated by the destination address prefix and the link cost from the second route source node 104 to the node 107 are both 10. In this case, the first minimum path cost is 20+10=30, and the second minimum path cost is 70+10=80.

However, when one or more of a link failure between the node 101 and the node 102, a failure of the node 102, and a link failure between the node 102 and the node 103 occur, the path with the minimum cost from the node 101 to the node 103 is changed to the node 101—the node 106—the node 105—the node 104—the node 103. In this case, the link cost of the path becomes 1070, the first minimum path cost is 1080, and the second minimum path cost remains unchanged. In this case, the second minimum path cost is less than the first minimum path cost. In this case, the first node 101 may switch the next-hop node of the first routing information to the next-hop node 106 through which the first node reaches the second route source.

Alternatively, when a link between the node 103 and the node 107 fails, a link cost from the first route source node 103 to the node 107 indicated by the destination address prefix is changed to 1010. In this case, the first minimum path cost is 1030, and the second minimum path cost remains unchanged. In other words, the second minimum path cost is less than the first minimum path cost. In this case, the first node 101 may switch the next-hop node of the first routing information to the next-hop node 106 through which the first node reaches the second route source.

In a second subcase, the minimum path cost does not include the cost of the destination address prefix and includes only the link cost. Similarly, for ease of understanding, FIG. 3 is used as an example for description.

In FIG. 3, when the network is normal and does not fail, if the minimum path cost includes only the link cost, the first minimum path cost is 20, and the second minimum path cost is 70. However, when one or more of a link failure between the node 101 and the node 102, a failure of the node 102, and a link failure between the node 102 and the node 103 occur, the path with the minimum cost from the node 101 to the node 103 is changed to the node 101—the node 106—the node 105—the node 104—the node 103. In this case, the link cost of the path becomes 1070, the first minimum path cost is 1070, and the second minimum path cost remains unchanged. In this case, the second minimum path cost is less than the first minimum path cost. In this case, the first node 101 may switch the next-hop node of the first routing information to the next-hop node 106 through which the first node reaches the second route source.

The case in which the first route source is unreachable for the first node includes one or more of the following cases.

In a first case, all paths from the first node to the first route source fail. For example, in the scenario shown in FIG. 3, it is assumed that the node 101 is the first node, and the node 103 is the first route source. In a normal case without any failure, a forwarding path from the node 101 to the node 103 may be the node 101—the node 102—the node 103. In this case, that all paths from the node 101 to the node 103 fail may be that the path: the node 101—the node 102—the node 103 and a path: the node 101—the node 106—the node 105—the node 104—the node 103 both fail. The failure includes a node failure and/or a link failure.

In a second case, the first route source fails. For example, in the scenario shown in FIG. 1, it is assumed that the node 103 is the first route source. In this case, the node 103 fails and can no longer forward a packet.

In a third case, the first route source no longer advertises the destination address prefix.

That the first route source no longer advertises the destination address prefix may be that all forwarding paths from the first route source to the second node fail in the second routing process. For example, in the scenario shown in FIG. 3, it is assumed that the node 103 is the first route source, and the second node may be the node 107. In this case, because a link between the node 103 and the node 107 fails and a path: the node 103—the node 104—the node 107 fails, the node 103 cannot sense the address prefix of the node 107. Therefore, the address prefix of the node 107 is not advertised in the first routing process.

Alternatively, that the first route source no longer advertises the destination address prefix may be that the first route source is no longer configured to advertise the address prefix, or the like.

It should be noted that the first node may sense, based on updated information flooded by each node in the network topology, that the first route source is unreachable. For example, the nodes in the network topology continuously flood address prefixes of the nodes (including address prefixes of other nodes introduced by the nodes). For example, the node 103 and the node 104 may advertise an address prefix (for example, the address prefix of the node 107) of a route in the introduced second routing process in addition to address prefixes of the node 103 and the node 104. In this manner, the nodes in the network may learn of the network topology, and the nodes update information about the network topology stored in the nodes based on each time of flooding. Therefore, when a node or a link fails, topology information of the node is lost after the information about the network topology is updated. It indicates that the node is unreachable. Further, in the third case, because the first route source no longer advertises the destination address prefix, the first node cannot find the destination address prefix in content flooded by the first route source, and the first node senses that the first route source no longer advertises the destination address prefix. Therefore, the first route source is unreachable for the first node.

In addition, the first node may alternatively sense in another manner that the first route source is unreachable. For example, the another manner may be notification from the controller. How to sense that the first route source is unreachable is determined based on an actual case. This is not limited in this embodiment.

S203. The first node adds first explicit path information to a target packet according to the switching operation. A destination address of the target packet matches the destination address prefix. The first explicit path information is used to indicate a forwarding path from the first node to the second route source.

For example, after the first node switches the optimal route source to the second route source, the first node senses that the optimal source is the second route source (for example, the first node senses that the next hop of the first routing information is the next hop from the first node to the second route source) instead of the first route source when forwarding the target packet to be sent to the second node. Path information used to explicitly specify a forwarding path from the first node to the second route source may be added to a packet header of the target packet to be sent to the second node. The path information may be referred to as the first explicit path information.

Optionally, the first explicit path information includes one or more of the following: a prefix label or a node label of the second route source, a node label or a prefix label of a node on a first forwarding path, and a link label of a link on the first forwarding path. The first forwarding path is a forwarding path from the first node to the second route source.

For example, the prefix label of the second route source is used to identify an address prefix of the second route source in the network. The prefix label of the second route source may be flooded to another node in a routing domain to which the second route source belongs. The prefix label of the second route source is globally visible and is globally valid in the routing domain. The node label of the second route source is used to identify the second route source. The link label is used to identify a link between two adjacent nodes.

For example, for a segment routing (SR) network (SRv6) based on Internet protocol version 6 (IPv6), the first explicit path information may be a segment identifier list (SID list) of the forwarding path from the first node to the second route source.

For example, for a segment routing (SR) network (SR-MPLS) based on multiprotocol label switching (MPLS), the first explicit path information may be a label stack of the forwarding path from the first node to the second route source.

It may be understood that the segment identifier list and the label stack may represent a same meaning with different names in different protocols.

In some possible implementations, the first explicit path information may be loose path information, or may be strict path information, provided that a path indicated by the first explicit path information is a loop-free path. The loose path information is opposite to the strict path information. The loose path information is information including only some labels on the entire forwarding path. For example, the first explicit path information includes only the prefix label or the node label of the second route source. The strict path information includes a node label of each node on the entire forwarding path or a link label of each link on the entire forwarding path. Further, the node label, the link label, and the prefix label may be independently used, or may be used in a mixed manner.

Figure 4:
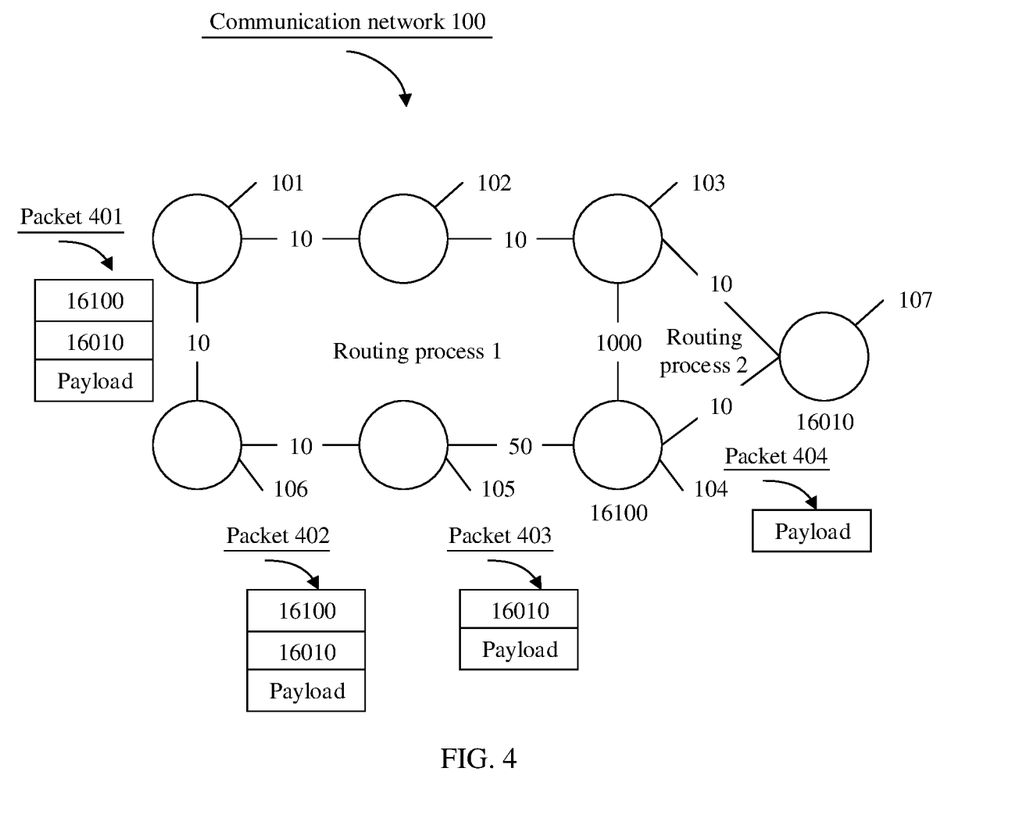
FIG. 4 is a schematic flowchart of packet forwarding based on a structure of a communication network according to an embodiment.

For example, FIG. 4 is a schematic flowchart of packet forwarding when the first explicit path information is loose path information in an example of the SR-MPLS. It should be noted that FIG. 4 shows the same structure of the communication network as FIG. 3. The foregoing description of FIG. 3 is also applicable to FIG. 4.

In FIG. 4, the forwarding path of the target packet is explicitly indicated by using the prefix label of the second route source node 104. In FIG. 4, prefix labels of the node 104 and the node 107 are respectively 16100 and 16010.

In this case, with reference to a packet 401 in FIG. 4, when forwarding the target packet, the node 101 adds the prefix label of the second route source node 104 to the packet header of the target packet. The packet 401 further includes a prefix label of the destination node, that is, the node 107 and a payload. The payload is data that needs to be forwarded. If the explicit path information is not added, that is, the prefix label of the node 104 is not added, because the node 106 does not converge, the node 106 may forward the packet to the node 101 after receiving the packet, to form a microloop. Because the next hop from the node 101 to the node 104 does not change before and after the route source switching, the prefix label of the node 104 added to the target packet is loop-free path information. In other words, the target packet can be successfully forwarded to the second route source node 104 based on the label of the node 104.

A process of forwarding the target packet in FIG. 4 is as follows:

The node 101 searches a forwarding table of the node 101 based on the prefix label 16100 of the node 104 to obtain an outbound interface of a next hop, and then sends the target packet (the packet 401 in FIG. 4) by using the outbound interface. The target packet is sent to the node 106.

Similarly, the node 106 searches a forwarding table of the node 106 based on the prefix label 16100 of the node 104 to obtain an outbound interface of a next hop, and then sends the target packet (a packet 402 in FIG. 4) by using the outbound interface. The target packet is sent to the node 105.

After receiving the packet, the node 105 searches a table and learns that the node identified by the prefix label 16100 is the next-hop node 104. Therefore, the node 105 pops the prefix label 16100, and then sends the target packet (a packet 403 in FIG. 4) to the node 104.

After receiving the packet, the node 104 searches a table based on the prefix label 16010 in the packet and learns that the node identified by the prefix label 16010 is the next-hop node 107. Therefore, the node 104 pops the prefix label 16010, and then sends the target packet (a packet 404 in FIG. 4) to the node 107. Therefore, the packet forwarding is completed.

Figure 5:
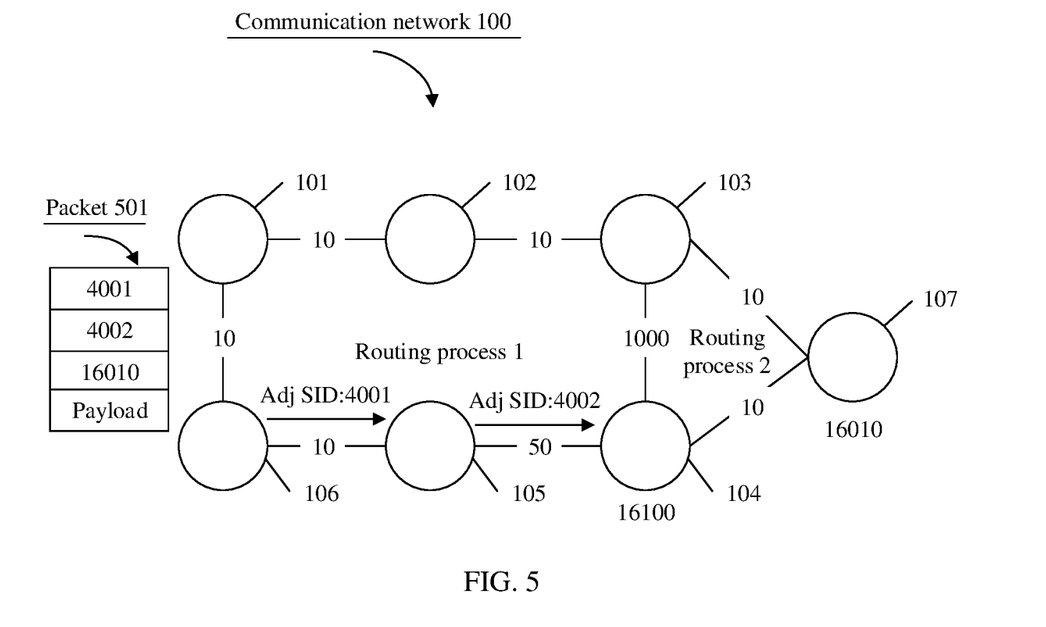
FIG. 5 is another schematic flowchart of packet forwarding based on a structure of a communication network according to an embodiment.

For example, FIG. 5 is a schematic flowchart of packet forwarding when the first explicit path information is strict path information in an example of the SR-MPLS. It should be noted that FIG. 5 shows the same structure of the communication network as FIG. 4. The foregoing description of FIG. 4 is also applicable to FIG. 5.

In FIG. 5, path information of a forwarding path of the target packet is explicitly indicated by using a link label. In comparison with FIG. 4, FIG. 5 further shows a link label 4001 of a link between the node 105 and the node 106 and shows a link label 4002 of a link between the node 105 and the node 104. The link label may also be referred to as an adjacency segment label (adjacency segment ID, Adj SID) in the SR-MPLS.

In this case, with reference to a packet 501 in FIG. 5, when forwarding the target packet, the node 101 adds the link labels 4001 and 4002 to the packet header of the target packet. The packet 501 further includes a prefix label of the destination node and a payload, that is, the node 107. The payload is data that needs to be forwarded. Then, the node sends the packet 501. A specific forwarding process is not described herein.

In the foregoing, the SR-MPLS is used as an example in FIG. 4 and FIG. 5. In an embodiment, this embodiment may also be applied to a network scenario such as SRv6. Details are similar to the SR-MPLS. Details are not described herein again.

S204. The first node forwards the target packet to the second route source through the forwarding path indicated by the first explicit path information.

It may be understood from the foregoing description that the first node sends the packet to the foregoing second route source after the first node adds the first explicit path information to the target packet. After receiving the packet, the second route source sends the packet to the second node based on a label or an address of the destination node in the packet, that is, the second node, to complete an entire forwarding operation of the packet.

In a possible implementation, that the first node adds the first explicit path information to the target packet according to the switching operation in S203 may include that within fixed duration after the switching operation, the first node adds the first explicit path information to the target packet according to the switching operation.

A microloop is formed due to transient inconsistency between different nodes because of different convergence sequences of nodes in a network. Therefore, a state of the microloop is only temporary. No microloop occurs after all the nodes in the network complete convergence. Therefore, in the embodiments, it is restricted that the explicit path information is added to the target packet only within the fixed duration after the route source switching operation. If the duration expires, the explicit path information does not need to be added, thereby saving computing resources of the first node. For example, based on the foregoing description of FIG. 1, it may be understood that a microloop is generated because convergence of the node 106 is slower than that of the node 101, but the optimal route source of the node 106 is also changed to the node 104 as the node 101 after the node 106 converges. After receiving the packet sent by the node 101, the node 106 no longer sends the packet back to the node 101 but sends the packet to the node 105, and the node 105 sends the packet to the node 104. In this way, the microloop disappears. In this case, the explicit path information may be no longer added to the forwarded target packet.

In an embodiment, the first node may set a timer. Before sending the target packet based on the operation of switching the optimal route source, the first node may first check information about the timer to determine whether current time is within the fixed duration after the switching operation. If current time is within the fixed duration, the first explicit path information is added to the target packet. If current time is not within the fixed duration, the first explicit path information may not need to be added.

For example, the timer may start timing when the switching operation is completed. It may be set that timing stops when timing meets the fixed duration. Before the target packet is sent, the first explicit path information is added to the target packet provided that it is determined that timing of the timer continues. If it is determined that the timing of the timer stops, the first explicit path information is not added to the target packet.

Alternatively, the timer may be a countdown timer. Countdown duration is preset to the foregoing fixed duration. A moment at which timing of the countdown timer starts is a moment at which the switching operation is completed. Before the target packet is sent, whether the countdown timer is zero out may be checked. If the countdown timer is not zero out, the first explicit path information is added to the target packet. If the countdown timer is zero out, the first explicit path information is not added to the target packet.

For example, the fixed duration may be any value between 3 seconds to 10 seconds. For example, the fixed duration may be 4 seconds, 5 seconds, 6 seconds, or 10 seconds.

In conclusion, in the embodiments, route source switching triggers an anti-microloop mechanism (adding explicit path information to a packet), thereby implementing an anti-microloop function in a multi-source switching scenario. In this way, problems such as network packet loss, delay variation, and packet disorder are avoided.

The foregoing mainly describes the packet sending method according to the embodiments. It may be understood that, to implement the foregoing functions, each device includes a corresponding hardware structure and/or software module for implementing each function. Persons of ordinary skill in the art should easily be aware that, in combination with units and algorithm steps of the examples described in the embodiments, the embodiments may be implemented by hardware or a combination of hardware and computer software. Whether a function is performed by hardware or hardware driven by computer software depends on particular applications and design constraints of the embodiments. Persons of ordinary skill in the art may use different methods to implement the described functions for each particular application, but it should not be considered that the implementation goes beyond the scope.

In the embodiments, functional module division may be performed on a device based on the foregoing examples in the method. For example, various functional modules may be obtained through division based on various corresponding functions, or two or more functions may be integrated into one module. The integrated module may be implemented in a form of hardware or may be implemented in a form of a software function module. It should be noted that, in this embodiment, module division is an example, and is merely a logical function division. In actual implementation, another division manner may be used.

Figure 6:
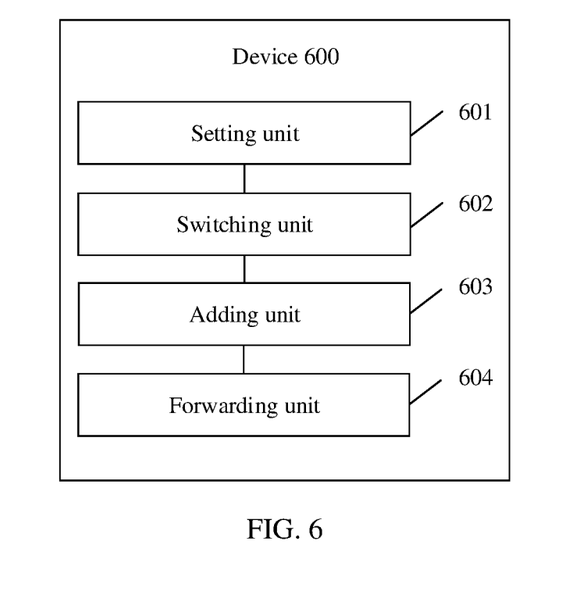
FIG. 6 is a schematic diagram of a logic structure of a device according to an embodiment.

When various functional modules are obtained through division based on various corresponding functions, FIG. 6 is a possible schematic diagram of a logic structure of a device. The device may be the foregoing first node. The device 600 includes a setting unit 601, a switching unit 602, an adding unit 603, and a forwarding unit 604.

The setting unit 601 is configured to set a next-hop node of first routing information to a next-hop node through which the device 600 reaches a first route source. A destination address of the first routing information is a destination address prefix.

The switching unit 602 is configured to: when a second route source is superior to a first route source, switch the next-hop node of the first routing information to a next-hop node through which the first node reaches the second route source.

The adding unit 603 is configured to add first explicit path information to a target packet according to the switching operation. A destination address of the target packet matches the address prefix. The first explicit path information is used to indicate a forwarding path from the device to the second route source.

The forwarding unit 604 is configured to forward the target packet to the second route source through the forwarding path.

In a possible implementation, the adding unit 603 is configured to:
within fixed duration after the switching operation, add the first explicit path information to the target packet according to the switching operation.

For specific operations and effects of the units of the device shown in FIG. 6, refer to the description of the method embodiment shown in FIG. 2. Details are not described herein again.

Figure 7:
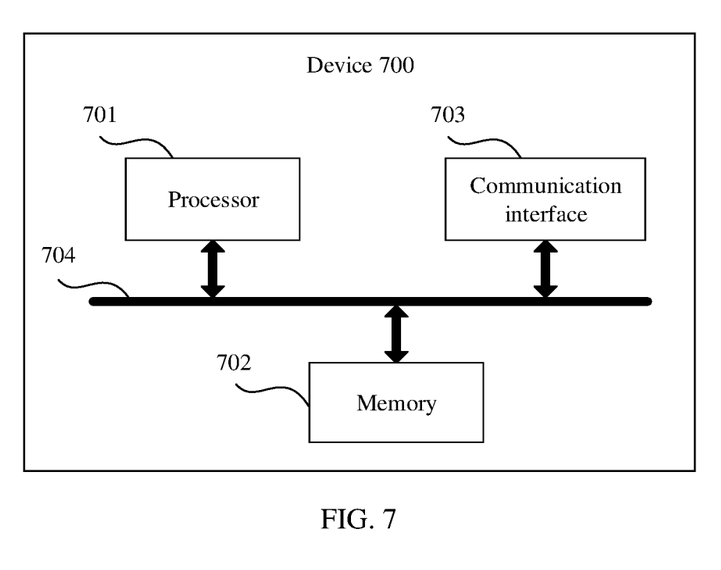
FIG. 7 is a schematic diagram of a hardware structure of a device according to an embodiment.

FIG. 7 is a schematic diagram of a possible hardware structure of a device according to the embodiments. The device may be the first node in the foregoing method embodiment. The device 700 includes a processor 701, a memory 702, and a communication interface 703. The processor 701, the communication interface 703, and the memory 702 may be connected to each other, or may be connected to each other by using the bus 704.

For example, the memory 702 is configured to store a computer program and data of the device 700. The memory 702 may include but is not limited to a random access memory (RAM), a read-only memory (ROM), an erasable programmable read-only memory (EPROM), or a compact disc read-only memory (CD-ROM). When the embodiment shown in FIG. 6 is implemented and the units described in the embodiment of FIG. 6 are implemented by using software, software or program code required for implementing functions of the switching unit 602 and the adding unit 603 is stored in the memory 702.

The communication interface 703 is configured to support the device 700 in communication, for example, receiving or sending a packet.

The processor 701 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor. The processor 701 may be configured to read the program stored in the memory 702 and perform operations of the first node in the method according to FIG. 2 and possible implementations.

An embodiment further provides a computer readable storage medium. The computer readable storage medium stores a computer program. The computer program is executed by a processor to implement the method according to FIG. 2 and possible implementations.

An embodiment further provides a computer program product. When the computer program product is read and executed by a computer, the method according to FIG. 2 and possible implementations is performed.

An embodiment further provides a computer program. When the computer program is executed by a computer, the computer is enabled to implement the method according to FIG. 2 and possible implementations.

Thus, in the embodiments, route source switching triggers an anti-microloop mechanism (adding explicit path information to a packet), thereby implementing an anti-microloop function in a multi-source switching scenario. In this way, problems such as network packet loss, delay variation, and packet disorder are avoided.

Terms such as "first" and "second" in the embodiments are used to distinguish between same items or similar items with basically same functions. It should be understood that "first", "second", and "$n^{th}$" do not have logic or time sequence dependency, and do not limit a quantity and an implementation sequence. It should further be understood that although terms such as "first" and "second" are used to describe various elements in the following, these elements are not limited by these terms. The terms are merely used to distinguish one element from another element. For example, without departing from the scope of the example, a first node may also be referred to as a second node, and similarly the second node may also be referred to as the first node. The first node and the second node may both be nodes. In some cases, the first node and the second node may be separate and different nodes.

It should be understood that sequence numbers of the foregoing processes do not mean execution sequences in various embodiments. The execution sequences of the processes should be determined according to functions and internal logic of the processes and should not be construed as any limitation on the implementation processes of the embodiments.

It should further be understood that the term "include" (also referred to as "includes", "including", "comprises", and/or "comprising") used in the embodiments indicates presence of features, integers, steps, operations, elements, and/or components, and presence or addition of one or more other features, integers, steps, operations, elements, components, and/or a combination thereof are not excluded.

It should be understood that "an embodiment" or "an embodiment" does not mean that particular features, structures, or characteristics related to the embodiment are included in at least one embodiment. Therefore, "in an embodiment" or "in an embodiment" appearing throughout does not refer to the same embodiment. In addition, these particular features, structures, or characteristics may be combined in one or more embodiments in any appropriate manner.

Further, it should be noted that the foregoing embodiments are merely intended for describing the solutions of the embodiments and are non-limiting. Although the embodiments are described in detail, persons of ordinary skill in the art should understand that they may still make modifications to the solutions described in the foregoing embodiments or make equivalent replacements to some or all features thereof, without departing from the scope of the solutions of the embodiments.

What is claimed is:

1. A method applied to a communication network, wherein the communication network comprises a first node, a first route source, and a second route source and both the first route source and the second route source are nodes for advertising an address prefix, the method comprising:
setting, by the first node, a next-hop of first routing information to a next-hop through which the first node reaches the first route source, wherein a destination address of the first routing information corresponds to the address prefix;
based on the second route source being superior to the first route source, switching, by the first node, the next-hop of the first routing information to a next-hop through which the first node reaches the second route source;

based on the second route source being superior to the first route source, adding, by the first node, first explicit path information to a target packet, wherein a destination address of the target packet matches the address prefix, and the first explicit path information is used to indicate a forwarding path from the first node to the second route source, wherein the first explicit path information comprises one or more of the following: a prefix label or a node label of the second route source, a node label or a prefix label of a node on a first forwarding path, and a link label of a link on the first forwarding path, wherein the first forwarding path is a forwarding path from the first node to the second route source; and forwarding, by the first node, the target packet to the second route source through the forwarding path, wherein the target packet comprises the first explicit path information.

2. The method according to claim 1, wherein the adding, by the first node, the first explicit path information to the target packet according to the switching operation further comprises:

within a fixed duration after the switching operation, adding, by the first node, the first explicit path information to the target packet according to the switching operation.

3. The method according to claim 1, wherein that the second route source is superior to the first route source further comprises:

a second minimum path cost from the first node to the second route source is less than a first minimum path cost from the first node to the first route source; or the first route source is unreachable for the first node.

4. The method according to claim 3, wherein the first route source is unreachable for the first node further comprises:

all paths from the first node to the first route source fail.

5. The method of claim 4, wherein that the first route source no longer advertises the address prefix further comprises:

all forwarding paths from the first route source to a second node fail, wherein an address of the second node matches the address prefix.

6. The method according to claim 3, wherein the first minimum path cost comprises a sum of a link cost from the first node to the first route source and a first cost of the address prefix, the first cost comprises a link cost from the first route source to a node indicated by the address prefix the second minimum path cost comprises a sum of a link cost from the first node to the second route source and a second cost of the address prefix, and the second cost comprises a link cost from the second route source to the node indicated by the address prefix.

7. The method according to claim 3, wherein the first route source is unreachable for the first node further comprises:

the first route source fails.

8. The method according to claim 3, wherein the first route source is unreachable for the first node further comprises:

the first route source no longer advertises the address prefix.

9. A packet sending device used in a communication network, the communication network comprising the packet sending device, a first route source, and a second route source, both the first route source and the second route source are nodes for advertising an address prefix, the packet sending device comprising:

at least one processor;

one or more memories coupled to the at least one processor and storing instructions for execution by the at least one processor, wherein the instructions instruct the at least one processor to cause the packet sending device to:

set a next-hop of the first routing information to a next-hop through which the device reaches the first route source, wherein a destination address of the first routing information corresponds to the address prefix;

based on the second route source being superior to the first route source, switch the next-hop of the first routing information to a next-hop through which the device reaches the second route source;

based on the second route source being superior to the first route source, add first explicit path information to a target packet, wherein a destination address of the target packet matches the address prefix, and the first explicit path information is used to indicate a forwarding path from the device to the second route source, wherein the first explicit path information comprises one or more of the following: a prefix label or a node label of the second route source, a node label or a prefix label of a node on a first forwarding path, and a link label of a link on the first forwarding path, wherein the first forwarding path is a forwarding path from the first node to the second route source; and forward the target packet to the second route source through the forwarding path, wherein the target packet comprises the first explicit path information.

10. The device according to claim 9, wherein when adding the first explicit path information to the target packet according to the switching operation, the packet sending device is further caused to:

within fixed duration after the switching operation, add the first explicit path information to the target packet according to the switching operation.

11. The device according to claim 9, wherein that the second route source is superior to the first route source further comprises:

a second minimum path cost from the first node to the second route source is less than a first minimum path cost from the first node to the first route source; or the first route source is unreachable for the first node.

12. A non-transitory computer readable storage medium, wherein the computer readable storage medium stores a computer program, and when the computer program is executed by a processor, implement a packet sending method, applied to a communication network, the communication network comprises a first node, a first route source, and a second route source, both the first route source and the second route source are nodes for advertising an address prefix, and the method comprises:

setting, by the first node, a next-hop of first routing information to a next-hop through which the first node reaches the first route source, wherein a destination address of the first routing information corresponds to the address prefix;

based on the second route source being superior to the first route source, switching, by the first node, the next-hop of the first routing information to a next-hop through which the first node reaches the second route source;

based on the second route source being superior to the first route source, adding, by the first node, first explicit path information to a target packet, wherein a destination address of the target packet matches the address prefix, and the first explicit path information is used to indicate a forwarding path from the first node to the second route source, wherein the first explicit path information comprises one or more of the following: a prefix label or a node label of the second route source, a node label or a prefix label of a node on a first forwarding path, and a link label of a link on the first forwarding path, wherein the first forwarding path is a forwarding path from the first node to the second route source; and forwarding, by the first node, the target packet to the second route source through the forwarding path, wherein the target packet comprises the first explicit path information.

\* \* \* \* \*